(12) United States Patent
Page

(10) Patent No.: US 8,536,505 B2
(45) Date of Patent: Sep. 17, 2013

(54) MOVABLE ILLUMINANCE SENSORS FOR FIXTURE LIGHT SOURCES

(75) Inventor: Erik Russell Page, Fairfax, CA (US)

(73) Assignee: Erik Page & Associates, Inc., Fairfax, CA (US)

( * ) Notice: Subject to any disclaimer, the term of this patent is extended or adjusted under 35 U.S.C. 154(b) by 316 days.

(21) Appl. No.: 13/179,512

(22) Filed: Jul. 9, 2011

(65) Prior Publication Data

US 2013/0009552 A1 Jan. 10, 2013

(51) Int. Cl.
*G01J 1/32* (2006.01)

(52) U.S. Cl.
USPC ............. 250/205; 250/214 AL; 250/214 D; 250/206; 315/158; 315/308; 315/312

(58) Field of Classification Search
USPC ......... 315/149–152, 158, 308, 312; 250/205, 250/206, 206.1, 214 AL, 214 D; 362/227; 700/45
See application file for complete search history.

(56) References Cited

U.S. PATENT DOCUMENTS

| | | | |
|---|---|---|---|
| 5,701,058 A * | 12/1997 | Roth | 315/158 |
| 7,592,583 B2 | 9/2009 | Page et al. | |
| 7,683,301 B2 | 3/2010 | Papamichel et al. | |
| 7,781,713 B2 | 8/2010 | Papmichel et al. | |
| 8,100,552 B2 * | 1/2012 | Spero | 362/231 |
| 2009/0128044 A1 * | 5/2009 | Nevins | 315/182 |
| 2011/0089842 A1 * | 4/2011 | Aldrich et al. | 315/152 |

* cited by examiner

*Primary Examiner* — Haiss Philogene
(74) *Attorney, Agent, or Firm* — Clifton Leon Anderson

(57) ABSTRACT

A lighting system including fixture lamps, e.g., ceiling mounted, and movable light sources, e.g., task lamps. The task lamps include illuminance sensors arranged to detect ambient light including light emitted by one or more fixture lamps and available daylight. Control data is generated based at least in part on the illuminance data. The resulting control data is transmitted from the task lamp to a fixture lamp and a window system so that it can be used to control the amount of light emitted by the fixture lamp and amount of daylight transmitted through the window system. This arrangement allows daylight harvesting while ensuring that the amount of light provided to workspaces (at which task lamps are located) is satisfactory.

24 Claims, 4 Drawing Sheets

MOVABLE ILLUMINANCE SENSORS FOR FIXTURE LIGHT SOURCES

BACKGROUND

Lighting systems are generally designed to use artificial (electric) lighting to provide an appropriate level of illumination within a space without respect to the availability of natural lighting (daylight). In this way it can be guaranteed that lighting levels will not fall below target levels when daylight is not present—such as at night or on cloudy days. However, when daylight is present, the sum of the availing daylight and the light provided by electric lighting can significantly exceed target illumination levels, which in turn wastes electrical energy. "Daylight harvesting" systems recognize when the presence of daylight has caused lighting levels to exceed their target levels and automatically reduce the electric lighting levels accordingly, resulting in reduced energy consumption.

DETAILED DESCRIPTION

The present invention provides for task lamps or other movable appliances to be equipped with light sensors for measuring incident light (illuminance). The resulting illuminance data can be communicated to controllers for controlling light output by overhead or other light fixtures. Including light sensors on task lamps or other appliances within an individual workspace allows them to measure the ambient light levels in the locations most relevant to productivity. This, in turn, makes for more effective room lighting, control-algorithm calibration, daylight harvesting, and energy conservation.

Figure 1:
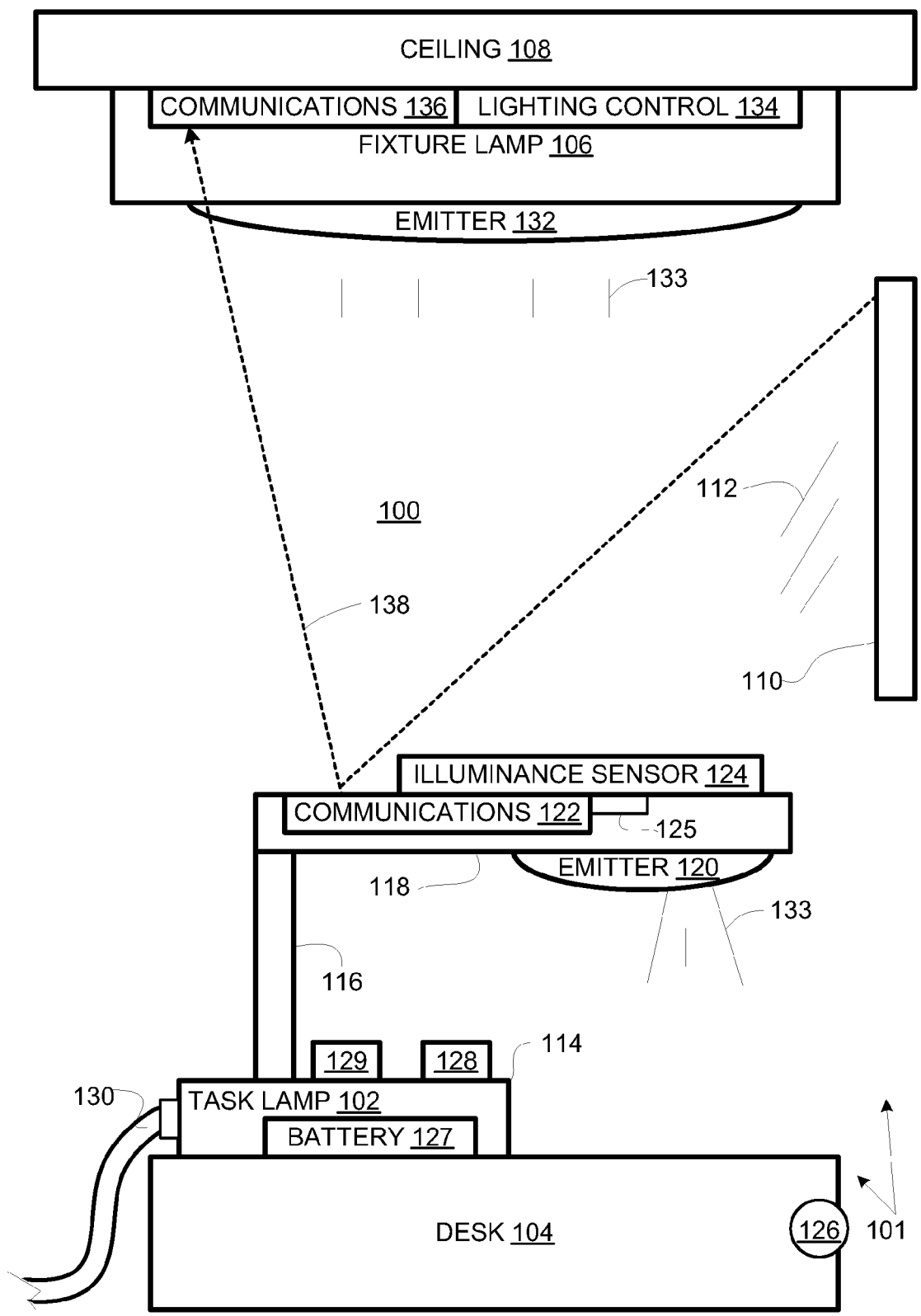
FIG. 1 is a schematic diagram of a portion of a work environment including a lighting system in accordance with the present invention.
Figure 2:
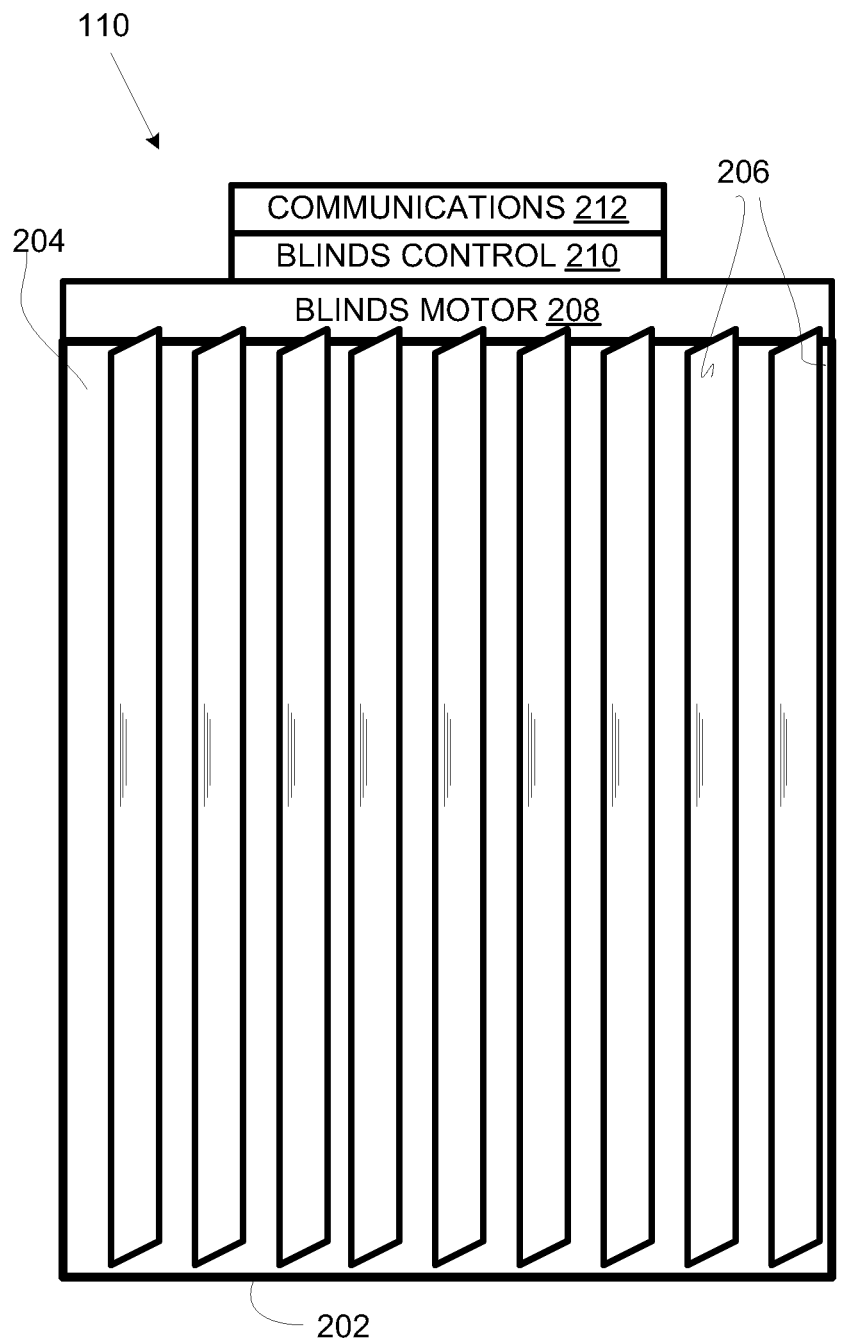
FIG. 2 is a schematic diagram of a window system of the lighting system of FIG. 1.

A work environment 100, shown in FIG. 1, has a lighting system 101 including a task lamp 102 supported on a desk 104, a fixture lamp 106 attached to a ceiling 108, and a window system 110 through which daylight 112 can enter work environment 100. Task lamp 102 includes a base 114, a shaft 116, and an arm 118. Arm 118 bears an emitter 120 for producing light 121, a communications subsystem 122, and a light sensor 124. Base 114 bears an occupancy sensor 126, a rechargeable battery 127, a task-light dimmer dial 128, and an ambient-light dimmer dial 129; base 114 has a power cord 130 attached. Fixture lamp 106 includes an emitter 132 for producing light 133, a lighting controller 134, and a communications subsystem 136.

Sensor 124 measures incident light including daylight 112 and artificial light from fixture lamp 106 to yield illuminance data 125. Sensor 124 is located on the top of lamp arm 118 so that its measurements can be representative of the light in the workspace around task lamp 102 (other than contributions from task lamp 102 itself). Sensor 124 has a field of view having a spatially averaged direction opposite (or at least more opposite than parallel to) a spatially averaged direction in which emitter 120 emits light. In part, this is so that the light emitted by task lamp 102 does not contribute significantly to the light detected by sensor 124. Arm 118 and sensor 124 can be positioned close to (relative to fixture lamp 106) and parallel to a work surface, such as the top of desk 104.

Sensor 124 can be in a better position to measure workspace lighting than a sensor mounted on fixture lamp 106 or on walls or ceiling 108 of work environment 100. Sensor 124 is well positioned to measure illuminance, e.g., corresponding to the amount of light falling on the top of desk 104. Sensors located near a ceiling or mounted on a fixture lamp would be more likely to measure luminance, which is less useful than illuminance in a daylight harvesting context. In order to use luminance in a daylight harvesting context, several assumptions must be made concerning its relationship with illuminance at a pertinent surface. Failure of these assumptions can lead to improper functioning of a daylight harvesting system.

Figure 4:
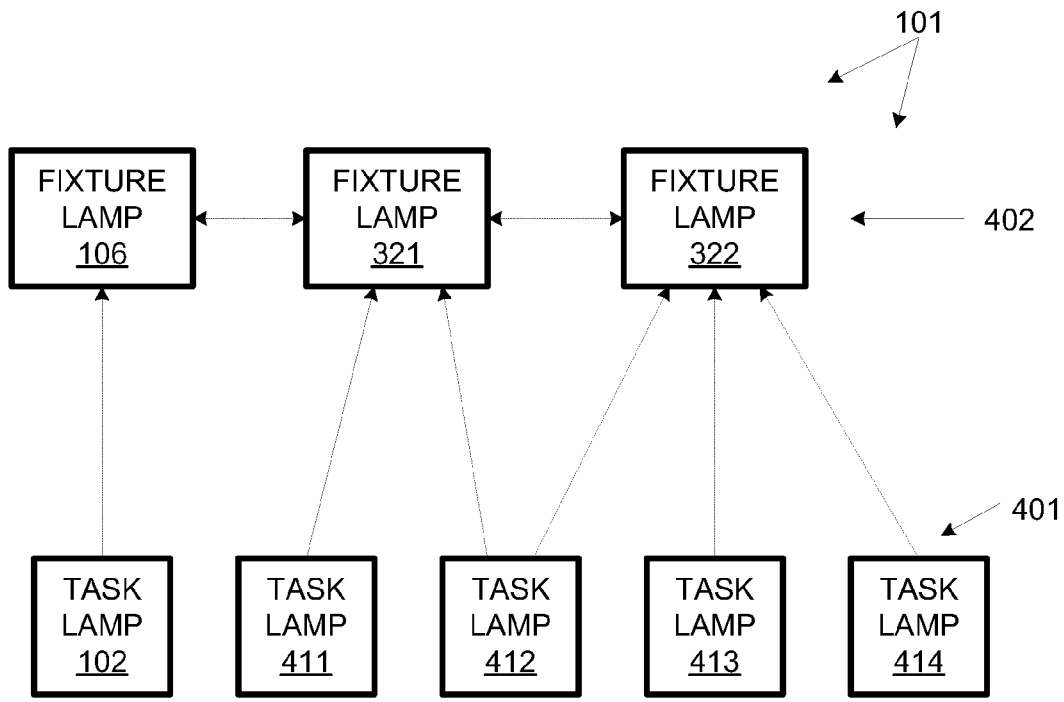
FIG. 4 is a schematic diagram of the work environment of FIG. 1.

Lighting system 101 provides for controlling the contributions of both artificial lighting and daylight to work environment 100. For example, window system 110 includes a window frame 402, a window pane 404, blinds 406, a blinds motor 408 for adjusting blinds 406, a blinds controller 410 for controlling motor 408, and communications subsystem 412 for receiving control data from task lamps 102 and 411-414 (FIG. 4). Thus, window system 110 provides for controlling the amount of daylight in work environment 100; in addition, window system 110 allows some selectivity regarding the area of work environment 100 to which daylight is directed.

Collectively, a plurality of such window systems (including skylight systems) can provide considerable control over how much daylight is available at various locations within work environment 100. While in general, more daylight is preferred, the ability to reduce the amount of daylight can be useful in reducing contrast to achieve more uniform interior lighting or to decrease glare. In alternative embodiments, more sophisticated blinds systems can be used to provide greater control over the directionality of incoming daylight. The ability to direct daylight to areas most in need of illumination can reduce the need for supplemental electric light and thus can enhance the energy savings due to daylight harvesting.

Figure 3:
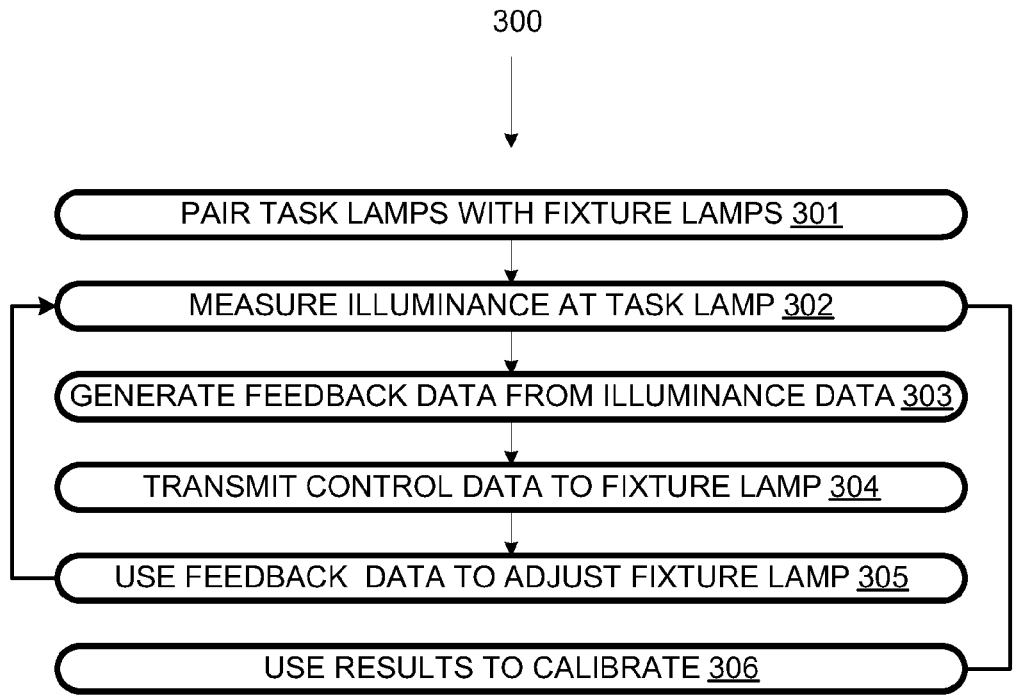
FIG. 3 is a flow chart of a process implemented by the lighting system of FIG. 1 in accordance with the present invention.

Lighting system 101 implements a process 300, flow charted in FIG. 3. At 301, a task lamp, e.g., task lamp 102 (or other sensor-bearing movable appliance), is "paired" with a fixture light source (e.g., fixture lamp 106 and/or window system 110) so that that they can communicate; in lighting system 101, a task lamp may be paired with more than one fixture light source (e.g., a fixture lamp and a window system or plural fixture lamps and plural window systems), and a fixture light source may be paired with more than one task lamp.

At 302, incident light is measured by sensor 124, yielding illuminance data 125. At 303, illuminance data 125 is converted to feedback data 138 (e.g., that can include data from occupancy sensor 126 or regarding the position of dimmers 128 and 129) other than (and in addition to) the illuminance data. A user can adjust the amount of ambient light by turning ambient-light dimmer dial 129. At 304, feedback data 138 is transmitted from task lamp 102 to fixture lamp 106. In addition, control data 138 can be transmitted to window system 110 to control the amount of daylight transmitted therethrough.

At 305, lighting controller 134 adjusts the intensity of light emitted by emitter 132 as a function of the feedback data, completing a control loop for fixture lamp 106. Likewise, blinds controller 210 can control the amount of daylight transmitted through window system 110 and, to some extent, select the area to which the daylight is directed. Since the feedback data used by the fixture-lamp and window-system control loops is gathered at a particularly relevant location, lighting system 101 more effectively and efficiently provides a desired level of lighting at a workspace. Also, the power source for emitter 120 can serve as a convenient power source for control elements such as sensor 124 and communications subsystem 122.

Once adjustments are made at 305 to the amount of light emitted by fixture lamp 106 and transmitted by window system 110, process 300 returns to 302 to measure the results of the adjustments, which can then be iteratively refined if the results are other than expected. In addition, if the results are other than as expected, the results at 302 can be used to calibrate the control algorithms employed by lighting controller 134 and blinds controller 210. For example, control-algorithm coefficients can be modified based on feedback from illuminance sensor 124. Process 300 further provides for a separate calibration procedure in which a series of adjustments in the output of fixture lamp 106 and window system 110 are made and the results of each adjustment are fed back to control subsystems 134 and 210 so that their respective control algorithms can be updated.

Rechargeable battery 127 provides power to sensors 124 and 126 and communications subsystem 122 when task-light dimmer dial 128 is in an off position to that task lamp 102 can function as part of the daylight harvesting system even when it is not providing light. The periodicity with which task lamp 102 communications with fixture lamp 106 can be reduced when battery power is used. In an alternative embodiment, so that the light provided by fixture lamp 106 can be regulated whether task lamp 102 is on or off, power provided via power cord 130 remains available to sensor 124 and communications subsystem 122 even when task-light emitter 120 is off.

The statuses of dimmers 128 and 129 can be communicated as part of feedback data 138; recent changes in task-light dimmer position can indicate occupancy and can correspond to needs for more or less ambient light. For example, a maximum dimmer setting may be interpreted by lighting control 134 as a request for more ambient light. Also, the dimmer setting can be useful because it can allow for an estimate of actual light level on the desk by allowing sensor reading (ambient light level) to be added to the task illuminance, which can be estimated based on knowledge of the photometric characteristics of the task light as various settings (or across the dimming range).

The fact that a task lamp is turned on immediately after interior light is reduced can be taken as an indication that the interior light is being dimmed too aggressively; in response, interior light output can be increased (and/or the algorithm used by the fixture lamp controller can be modified). The position of dimmer 128 can be communicated to indicate an amount of illuminance provided by task lamp 102 so that light from fixtures can be adjusted accordingly. Similarly, occupancy data from occupancy sensor 126 can be communicated as part of control data 138 for use by lighting control 134.

The present invention has applicability to contexts in which a large work area is divided into individual workspaces, e.g., cubicles defined by movable modular workspace partitions. In this context, as indicated schematically in FIG. 4, there may be multiple task lamps 401, e.g., task lamps 102 and 411-414, and multiple fixture lamps 401, e.g., fixture lamps 106, 421, and 422, as well as multiple window systems. Each fixture lamp can include a communications subsystem, a lighting controller, and an emitter. Each window system can include a communications subsystem, a controller, a blinds motor, and blinds. Each task lamp can include one or more sensors, a communications subsystem, and an emitter.

Fixture lamps 106, 421, and 422 can communicate with each other, e.g., to determine each other's states and for calibration purposes. For example, fixture lamps 106, 421, and 422 can enter a calibration mode in which they turn off and on in a known sequence or pattern while checking the effects of the changes as measured at task lamps 102 and 411-414. Also, each lamp can track the effects of changes in its settings; the resulting data can be communicated among fixture lamps and used in each other's control algorithms. In some cases, the results of calibration can trigger changes in pairings between fixture lamps and task lamps so that a task lamp is paired with the fixture lamp that has the strongest effect on illuminance at that task lamp. In lighting system 101, communication among fixture lamps is via in-ceiling wired connections; in an alternative embodiment, fixture lamps communicate wirelessly. In another embodiment, a single controller controls plural fixture lamps so that calibration can proceed without communication among fixture lamps.

Figure 5:
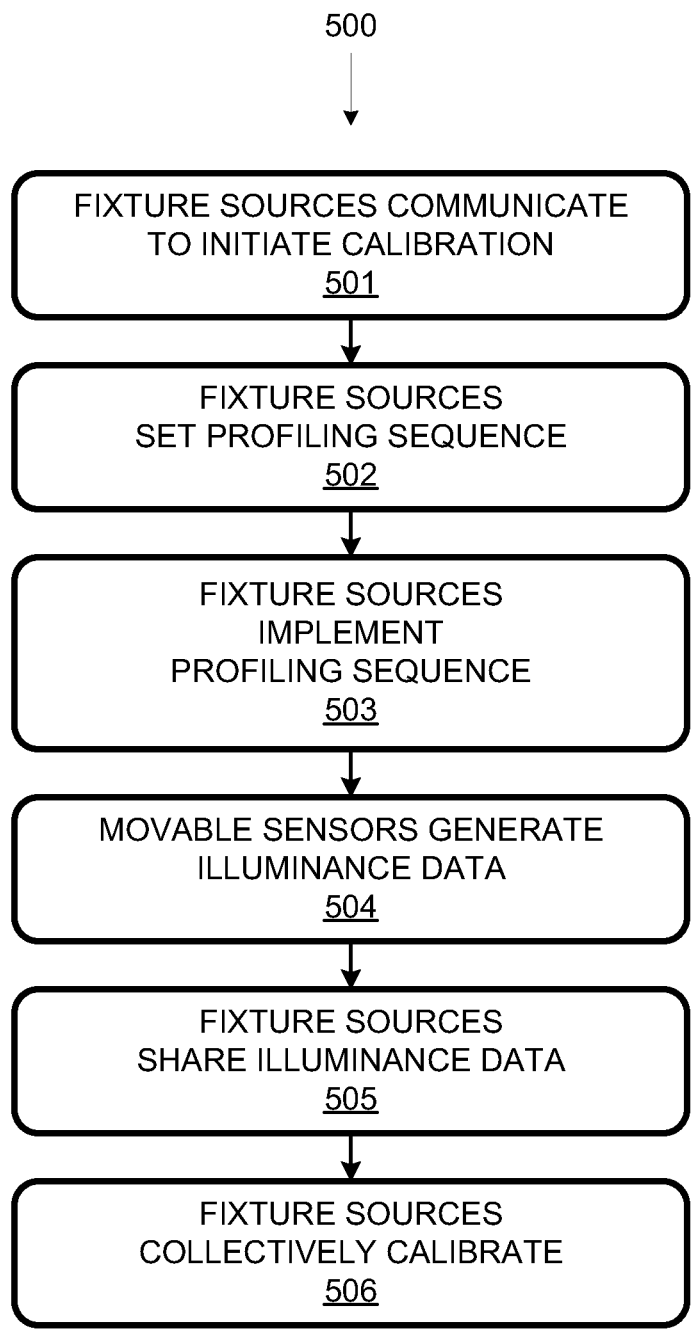
FIG. 5 is a flow chart of a calibration subprocess of the process of FIG. 3.

Process 300 provides for a multi-source subprocess 500, flow charted in FIG. 5. At 501, fixture sources (lamps and windows) can communicate with each other to initiate a calibration procedure. This can be upon initialization, user command, and/or detection of a situation in which a fixture source fails to calibrate itself during normal operation as described with respect to FIG. 3. Moreover, inter-fixture communications can be used for other purposes. For example, when during normal operation, a fixture lamp determines that a task sensor is more closely associated with its output than a task sensor to which it is currently paired, the auto-calibration process can pair the fixture lamp with the more closely associated task sensor.

At 502, the fixture sources set a profiling sequence. This is a sequence in which different fixture sources make adjustments at different times, with each source making one or more adjustments. At 503, the sequence is implemented. At 504, the movable sensors detect the results for each adjustment and feedback the resulting illuminance data to the fixture sources. At 505, the fixture light sources share illuminance data (in the case that at least some fixture light sources cannot receive illuminance data from all sensors). At 506, the fixture light sources communicate so that they can mutually calibrate. This collective calibration procedure allows the incorporating lighting system to determine which fixture light sources should be used to make what adjustments for each individual work location.

Since illuminance decreases with increased distance from the source, illuminance data typically represents interior light output from only a subset of the fixture lamps in the area; correspondingly, the feedback data from a task lamp may be useful for controlling those fixture lamps. Accordingly, the communications subsystems, which may operate using radio frequencies (e.g., as employed by WiFi, Bluetooth, and ZigBee) may be paired through an automatic, semi-automatic, or manual process. In some cases, there is a one-to-one pairing, e.g., between task lamp 102 and fixture lamp 106. In other cases, more than one task lamp is paired with a fixture lamp, e.g., task lamps 411 and 412 are paired with fixture lamp 421. In some cases, a task lamp may be paired with more than one fixture light source, e.g., task lamp 412 is paired with fixture lamps 321 and 422 and window system 110.

Communications between task lamps and fixture light sources can employ wired or wireless paths. In some embodiments, Ethernet or other wired computer network connections are used. In some embodiments, communication is over power lines, e.g., a power cord over which a task lamp receives electrical power. In the illustrated system 102, the amount of light emitted by task lamp 102 is not affected by readings by sensor 124; in an alternative embodiment, the amount of light output by a task lamp or other sensor-bearing movable appliance is adjusted based on amounts of incident light detected by its light sensor.

In some embodiments, a limited range radio-frequency signal is used to broadcast feedback signals, but only used by the fixtures close enough to receive it at a suitable signal strength. In other embodiments, a directional feedback data signal, which may be infra-red based, is used, and only those fixtures within a field of view receive the directional control signal. In some embodiments, fixture-lamp control systems communicate with each other to determine which fixture lamps accept data from which task lamps. In an embodiment, a single lighting controller controls plural fixture lamps.

Some embodiments provide for battery-powered task lamps, either in addition to or instead of mains power. Battery power can be used as a backup to mains power. In some embodiments, an on/off switch cuts off mains power so a battery is relied upon to power a sensor and a communications subsystem when the lamp is off. Rechargeable batteries can be recharged using mains power. In some embodiments, a task-lamp battery is charged using available light and solar cells; in some embodiments, solar cells are integrated with the illuminance sensor. Also, in some cases, the movable appliance is an illuminance sensor combined with a wireless communications system without a light source.

The invention provides for a variety of task-lamp styles. For example, task lamps can be floor standing, desk standing, or clamped or otherwise attached to a desk, bookshelf, or cubicle partition. Both articulating (e.g., gooseneck or pivoting) and non-articulating task lamps can be used. In some cases, an illuminance sensor is located on a non-articulating portion (e.g., a stabilized knuckle) of an articulating task lamp so that the sensor remains parallel to a desk or other work surface. Some deviations from parallel can be tolerated as variations (errors) in illuminance readings due to being off-parallel follow a cosine function; less than a 20° tilt results in an illuminance reading error of less than 6%. Larger tilts, e.g., as long as the sensor is more parallel to than orthogonal to the work surface, can be handled by tracking and compensating for the degree of tilt.

In alternative embodiments, occupancy sensors are located on the base of a lamp or other appliance. In other embodiments, occupancy sensors are connected to an appliance over a cord over which sensor data and/or power may be conveyed. Such embodiments can allow the occupancy sensor to be located away from the appliance body when a more appropriate location for sensing occupancy is available.

In some embodiments, the illuminance sensor is hosted by a device other than a task lamp. Almost any electrical appliance located in a workspace can be used. For example, a computer monitor can host an illuminance sensor for use in controlling fixture lamps. In such a case, monitor state (e.g., on, sleep, off) data can be transmitted as part of the feedback data; a fixture-light controller can use the monitor state in deciding how much interior light to provide to the workspace. Herein, cathode-ray tube, backlight LCD and other light producing monitors are considered "light-sources". Also, the sensor can be built into some part of a laptop or desktop computer other than a monitor. Furthermore, the sensor can be attached to a computer; for example, the sensor can be in the form of a USB (Universal Serial Bus) dongle. Also, the sensor can be free-standing with an integrated communications subsystem.

As indicated above, a fixture lamp controller can be internal to a light fixture or external. In either case, one controller may control only one fixture light source or plural fixture light sources. In some embodiments, controllers communicate with each other for coordinated control of fixture lighting. For light fixtures (e.g., motorized track lamps, lamps with motorized reflectors, and LED arrays) that can control the directionality of the light they emit, feedback data can be used to adjust directionality as well as intensity.

In some embodiments, a fixture lamp may provide for multiple light distribution patterns, e.g., that depend on which lamps are switched on. For example, a fixture lamp can include direct and indirect pendants. With such a lamp, one can turn on only the indirect up lights, only the direct down lights, or both, for three dictated distribution patterns. For such a lamp, the illuminance data can be used in selecting among these distribution patterns.

In an embodiment, a retrofit system (rather than a complete system) upgrades an existing control system. For example, a lighting-control system may already be in place that allows the ceiling lighting to be dimmed or controlled (by daylight sensors, manual controls, occupancy sensors, computer control systems, etc). Such a system can be retrofitted so that it can receive control signals from subsequently added task lamp sensors. The feedback signal from the task light sensors could be in addition to the existing control inputs (daylight, occupancy, manual) or in place of them.

In a retrofit embodiment, task lamps communicate to a wall switch that controls a circuit of fixture lamps. In an office that has bi-level or multi-level switching (i.e., two or more switches that each turn off some—but not all—of the lamps in each fixture or turn off some—but not all—fixtures in a space). The retrofit adds the sensor task lights to the workstations and then replaces the existing wall switches with switches that can receive the task sensor signals. No rewiring of the fixtures themselves is involved.

In the illustrated embodiment, lighting controllers are built into the light fixtures. In alternative embodiments, a centralized lighting controller can control multiple light fixtures. In either case, there can be a "central command" element where a facility manager, etc., can monitor, calibrate, and modify settings and set points, etc., for the system.

Herein, an "emitter" is a device that emits lights, e.g., by converting electricity into light. Incandescent bulbs, fluorescent bulbs, LEDs, photo-diodes, can all serve as emitters or as elements in multi-element emitters. Herein, a "lamp" is a device designed to host an emitter, which may be replaceable. When hosted by a lamp, an emitter becomes part of the lamp. Herein, a "collective calibration procedure" is one in which fixture sources communicate with each other to initiate a calibration procedure, determine a profiling sequence, and/or to coordinate their calibrations (e.g., to avoid undesirable interactions among individual calibrations).

A "fixture" is attached to real property, e.g., a ceiling or wall of a building. "Movable" refers to something not attached to real property; for example, a movable lamp may be attached to an object, e.g., a partition or desk, that is not real property, or may be unattached, e.g., a floor-standing or desk lamp. Herein, "luminance" is a measure of light coming off a surface (e.g., from a self-illuminating surface or a reflection from a surface); "illuminance" is a measure of light falling on a surface. A "convex space" is a space in which all points between any two points in the space are within the space. The foregoing and other variations upon and modifications to the illustrated embodiments are within the scope of the claims.

What is claimed is:

1. A system comprising a first movable appliance including:
   a first sensor subsystem configured to provide first illuminance data based on an amount of light incident to said first sensor subsystem; and
   a first data-transmission subsystem for transmitting first feedback data including said first illuminance data from said first movable appliance to a first lighting controller.

2. A system as recited in claim 1 further comprising:
   said first lighting controller, said first lighting controller being configured to control amounts of light transmitted by a first fixture light source based at least in part on said first feedback data; and
   a first communications subsystem for receiving said first feedback data and providing it to said first lighting controller.

3. A system as recited in claim 2 further comprising said first fixture light source, said first fixture light source being a first fixture lamp.

4. A system as recited in claim 3 wherein said first fixture lamp includes said first lighting controller and said movable appliance is a first movable light source.

5. A system as recited in claim 3 further comprising plural fixture light sources of which said first fixture lamp is one, each of said fixture light sources including a respective lighting controller for controlling amounts of light transmitted by that fixture light source.

6. A system as recited in claim 5 further comprising plural movable appliances of which said first movable appliance is one, each of said movable appliances including:
   a respective power cord or a respective power-cord socket to which the respective power cord can be attached so that the respective appliance can receive electrical power through the respective power cord;
   a respective light sensor subsystem for measuring an amount of light incident to at least a portion of the respective appliance, the respective light sensor subsystem including at least a respective illuminance sensor, the respective light sensor subsystem being configured to provide respective illuminance data; and
   a respective data-transmission subsystem for transmitting respective feedback data based at least in part on said illuminance data to said first fixture light sources.

7. A system as recited in claim 6 wherein said fixture light sources communicate with each other to implement a collective calibration procedure.

8. A system as recited in claim 7 further comprising plural movable appliances, each of said movable appliances including:
   a respective power cord or a respective power-cord socket to which the respective power cord can be attached so that the respective appliance can receive electrical power through the respective power cord;
   a respective appliance light source adapted to be powered by electrical power;
   a respective sensor subsystem for measuring an amount of light incident to at least a portion of the respective appliance, the respective sensor subsystem including at least a respective illuminance sensor, the respective light sensor subsystem being configured to provide respective illuminance data; and
   a respective data-transmission subsystem for transmitting said first illuminance data to a respective fixture source so that fixture sources receive data from different movable appliances.

9. A system as recited in claim 1 wherein said first movable appliance includes a power cord and said feedback data is communicated to said first lighting controller at least in part over said power cord.

10. A system as recited in claim 1 wherein said first illuminance data is communicated to said first lighting controller at least in part over a wireless communications channel.

11. A system as recited in claim 1 wherein said first illuminance data is communicated to said first lighting controller at least in part over a wired network to which said first movable appliance is physically connected.

12. A system as recited in claim 1 wherein said first movable appliance is a task lamp.

13. A system as recited in claim 1 wherein said first movable appliance is a computer monitor.

14. A system as recited in claim 3 wherein said fixture lamp is attached to a ceiling and said movable appliance is supported by a desk.

15. A system as recited in claim 1 wherein said first movable appliance is configured so that an amount of light generated by said movable appliance does not vary automatically in response to changes in amounts of light incident to said sensor.

16. A system as recited in claim 1 wherein said first movable appliance includes a controller for varying an amount of light generated by said movable appliance in response to changes in amounts of light incident to said sensor.

17. A system as recited in claim 5 further wherein at least one of said light sources is a window system including blinds, a blinds communications subsystem for receiving said first feedback data, and a blinds control system for controlling said blinds at least in part as a function of said first feedback data so as to adjust an amount of daylight transmitted through said window system.

18. A system as recited in claim 17 wherein said blinds control system further provides for controlling what locations are illuminated by daylight transmitted through said window system.

19. A process comprising:
   illuminating a workspace using daylight and artificial light received from at least one fixture source;
   measuring light incident to at least a portion of a movable electrical appliance so as to generate illuminance data;
   communicating feedback data including said illuminance data from said electrical appliance to a lighting controller; and
   controlling light output by said fixture source at least in part as a function of said illuminance data.

20. A process as recited in claim 19 wherein said feedback data includes occupancy data obtained from an occupancy sensor attached to said movable electrical appliance.

21. A process as recited in claim 19 wherein said movable electrical appliance is a task lamp.

22. A process as recited in claim 19 wherein said fixture source is a fixture lamp and said lighting controller is a component of said fixture lamp.

23. A process as recited in claim 19 wherein said fixture source is a window system including blinds that can be controlled to adjust an amount of light transmitted through said window system.

24. A process as recited in claim 19 wherein plural fixture sources communicate with each other to implement a collective calibration procedure.

* * * * *